United States Patent [19]

Harrison et al.

[11] Patent Number: 4,602,926
[45] Date of Patent: Jul. 29, 1986

[54] OPTICAL FIBRE FABRICATION

[75] Inventors: Andrew P. Harrison, Berden; Malcolm D. MacKay, Harlow, both of England

[73] Assignee: Standard Telephones and Cables Public Limited Company, London, England

[21] Appl. No.: 662,884

[22] Filed: Oct. 19, 1984

[30] Foreign Application Priority Data

Oct. 22, 1983 [GB] United Kingdom ............... 8328292

[51] Int. Cl.⁴ ............................................. G03B 37/027
[52] U.S. Cl. ......................................... 65/3.11; 65/3.2; 65/13
[58] Field of Search ............... 65/2, 3.11, 3.2, 3.13, 65/13, 18.2

[56] References Cited

U.S. PATENT DOCUMENTS

| 3,711,262 | 1/1973 | Reck et al. ............ | 65/18.2 X |
| 3,884,550 | 5/1975 | Maurer et al. .......... | 65/3.11 X |
| 4,217,123 | 8/1980 | Titchmarsh ............. | 65/3.13 |
| 4,280,827 | 7/1981 | Murphy ................. | 65/13 X |
| 4,289,516 | 9/1981 | Krohn .................. | 65/13 X |
| 4,351,657 | 9/1982 | Kimura ................. | 65/3.11 |

FOREIGN PATENT DOCUMENTS

| 47-0824 | 1/1972 | Japan ................... | 65/3.13 |
| 47-26735 | 7/1972 | Japan ................... | 65/3.13 |
| 925335 | 5/1963 | United Kingdom . | |
| 993322 | 5/1965 | United Kingdom . | |
| 1031891 | 6/1966 | United Kingdom . | |
| 2082166 | 3/1982 | United Kingdom . | |

OTHER PUBLICATIONS

Optical Fiber Telecommunications; edited by Steward E. Miller et al, published by Academic Press Inc., Orlando, Fla., 1979, p. 272.

Primary Examiner—Kenneth M. Schor
Attorney, Agent, or Firm—Kerkam, Stowell, Kondracki & Clarke

[57] ABSTRACT

A rod-in-tube method of manufacturing optical fibre where the rod and the tube are fed into the heating zone of a furnace at different rates, the rod feed rate being greater than the tube feed rate. The rod is mounted relative to the tube such as to permit self-centering of the rod in the tube when the tube collapses onto the rod in the heating zone. The drawn fibre may be monitored by means of an in-line fibre core to O/D monitor and feed-back employed to drive the tube and rod feed mechanisms accordingly thereby providing precise control of the core to O/D ratio of the fibre. Very long fibre lengths may be achieved by feeding the rod into the heating zone at a greater rate than a very large mass tube billet and consecutively feeding further rods into the tube billet as the preceding rod is used up.

7 Claims, 5 Drawing Figures

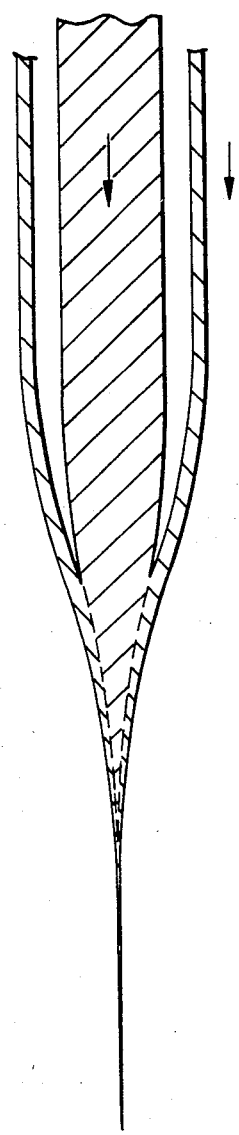
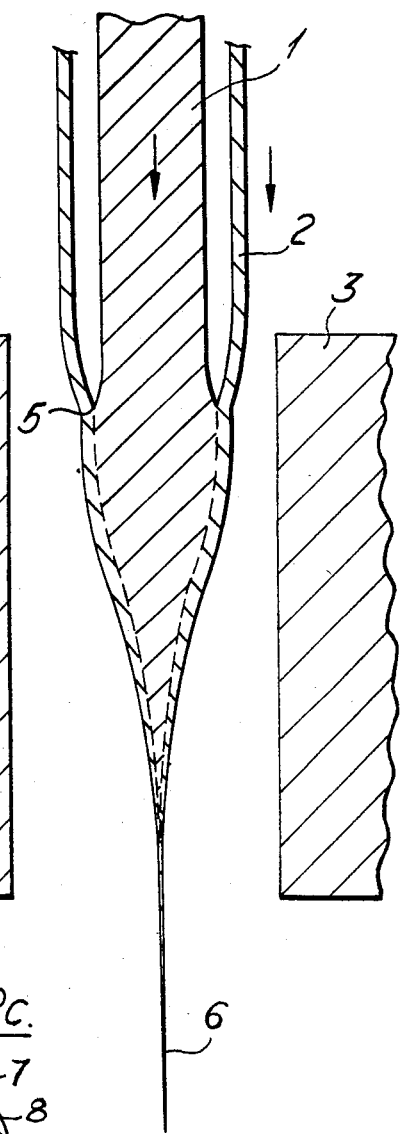
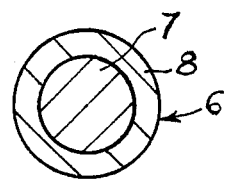
Fig. 2a. PRIOR ART
Fig. 2b.
Fig. 2c.

4,602,926

OPTICAL FIBRE FABRICATION

BACKGROUND OF THE INVENTION

This invention relates to the fabrication of optical fibres and in particular to silica-based optical fibre fabrication employing a rod-in-tube method of manufacture.

In the type of rod-in-tube method of manufacture of optical fibre with which the invention is particularly, but not exclusively concerned, a rod preform, comprising a rod of glass forming the core material of a fibre and provided with a core-cladding structure is placed inside a sleeve tube of glass, which serves to increase the cross-sectional area of the composite. The rod preform and tube assembly is then lowered into a furnace. In the hot zone the tube collapses onto the rod preform forming a single entity which is then drawn down into a fibre. There are many factors which influence the quality of the resultant fibre including assembly advance rate, fibre draw rate, furnace temperature, furnace hot zone profile, and start rod and tube geometry. The rod-in-tube method serves to extend the fibre yield of a rod preform by adding to it the mass of the sleeve tube. To achieve the correct core to O/D (outside diameter) ratio in the final fibre, the optical material in the rod preform is conventionally grown to be oversize, so that a sleeve tube of a given cross-sectional area will reduce it to the correct geometry in the final fibre.

SUMMARY OF THE INVENTION

According to the present invention there is provided a rod-in-tube method of manufacturing an optical fibre including the step of feeding a rod and a tube into the heating zone of a furnace at different rates, with the rod feed rate being greater than the tube feed rate, the rod being mounted relative to the tube in such a manner as to permit self-centring of the rod in the tube when the tube collapses onto the rod in the heating zone.

BRIEF DESCRIPTION OF THE DRAWINGS

Embodiments of the invention will now be described with reference to the accompanying drawings, in which:

FIGS. 2a and 2b respectively illustrate the drawn down zone in a conventional rod-in-tube process and in a draw-down process according to the present invention, and FIG. 2c illustrates on an enlarged scale a cross-section through an optical fibre produced by the draw-down process according to the present invention.

DESCRIPTION OF THE PREFERRED EMBODIMENT

Figure 1:
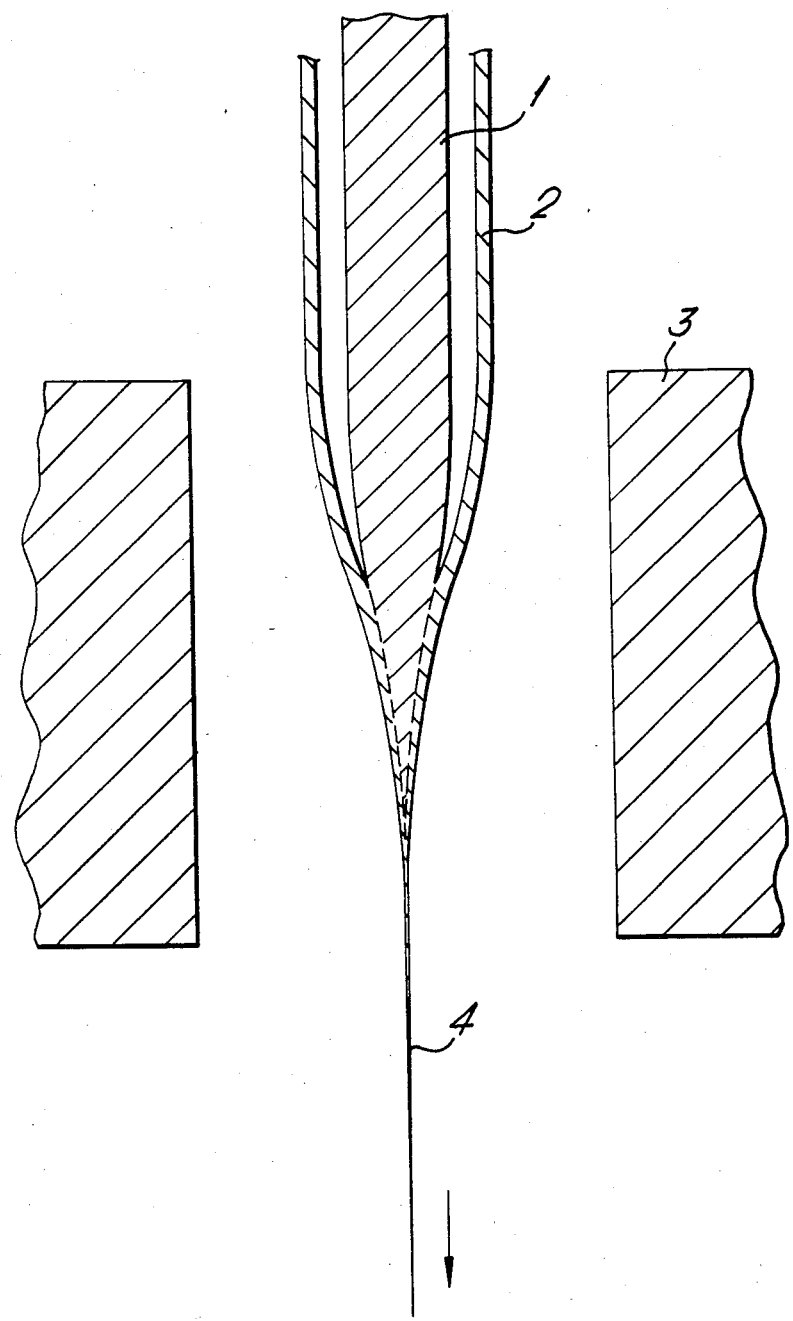
FIG. 1 illustrates schematically the basic rod-in-tube collapse and draw process.

Referring firstly to FIG. 1, the basic rod-in-tube collapse and draw process is such that a rod preform 1 prealigned within a sleeve tube 2 (by means not shown) are together advanced down through a furnace 3 at a predetermined rate and fibre 4 drawn from the tip at a corresponding predetermined rate. Hitherto the rod preform 1 has been prealigned in the sleeve and the two elements fixed rigidly with respect to one another at the upper end by glass blowing techniques or by a mechanical double chuck arrangement. No matter how accurately this prealignment is achieved, if the tube and/or preform is/are bowed, there will be "frozen-in" non-concentricity over parts of the overall length of the assembly. This can lead to core to O/D non-concentricity in corresponding parts of the final drawn fibre.

We have found that it is possible to control the core to O/D ratio in the fibre, without the need for special selection of the sleeve tube cross-sectional area, if the rod and tube are advanced into the furnace at different rates. This means that the mass ratio of the rod preform and sleeve tube going into the fibre at any given time can be varied, which ratio depends on the relative feed rates and cross-sectional areas. An example of this is where a sleeve tube is selected which is approximately twice as massive as required to generate the correct core/OD ratio. The rod preform feed rate is then controlled in a range about twice that of the sleeve tube, the exact ratio depending on the core/OD ratio of the individual preform. FIG. 2a illustrates the shape of the draw down zone for the standard rod in tube process and FIG. 2b the shape of the draw down zone in the case where the rod is advanced significantly faster than the tube, the ratio being approximately 3.3 to 1. The normally concave draw-down profile (FIG. 2a) has been replaced by the bulged out profile which is convex below the meniscus 5 between the rod and the tube (FIG. 2b). In this case a force was being applied to drive the rod into the hot zone of a furnace 3. FIG. 2b indicates a rod preform 1 and a sleeve tube 2 which is collapsed onto the rod preform 1 to form a single element from which an optical fibre 6 is drawn. The optical fibre 6 comprises a Core 7 formed from the rod preform 1 and a cladding layer 8 formed from the sleeve tube 2. We have also found that in a rod-in-tube drawing process in which the rod preform is being fed faster than the sleeve tube there exist forces which tend to centre the rod inside the shrinking tube bore in the hot zone. It is considered that parameters such as gravity, drawing tension, surface tension and symmetry of the tube draw down zone may contribute to this phenomenon. Thus the rod should not be rigidly clamped with respect to the tube, rather the rod should be allowed to self-centre in the tube. The rod in the differential feed arrangement should be permitted to pivot freely about a point at the top and in the centre of the tube. For this purpose a frictionless pivot mechanism, for example a gimbal arrangement, may be employed. Excellent radial symmetry of the draw-down zone and of the preform inside the tube are then obtained, whereas with the conventional glass-blowing or mechanical double chuck methods of clamping the rod and tube, whilst the meniscus between the rod and the tube can be flat, that is in a single plane normal to the longitudinal axis of the tube, if the rod and tube happen to be perfectly concentric, in practice non-concentricity between the rod and the tube in the draw-down zone can occur and a tilted meniscus results. In the case of differential feed rates and mounting permitting movement of the rod relative to the tube, the meniscus between the rod and the tube is perfectly flat.

The differential feed process permits continuous control of the core to O/D ratio to be achieved. The output from an in-line fibre core to O/D ratio monitor situated beneath the drawing furnace can be coupled with (feedback to) the mechanism employed to achieve the relative advance of the rod and tube. In this way tight control to a predetermined core to O/D ratio can be achieved even where variation of this parameter is occurring along a single rod preform, such as might be caused by core taper. Thus it is possible to use a higher percentage of a rod preform's length, since uniform fibre can be generated from non-uniform parts of the original preform which would otherwise have to be discarded. For obtaining differential feed of the rod and tube, various drive mechanisms may be employed. The sleeve tube advance means may be substantially conventional and merely independent of the rod preform advance means which may likewise be substantially conventional.

In addition, the differential feed rod-in-tube process can be used to apply a relatively thin coating of a material suitable for application at temperatures around the normal fibre drawing level. Typically such a material would be applied in order to improve the strength characteristics of a fibre. For example, titanium ($TiO_2$) doped silica can be used as a thin compressive layer on the surface of a fibre to increase the strain level at which surface cracks will propagate. It would be extremely difficult to sleeve a preform with a sufficiently thin walled tube to achieve this effect by conventional rod-in-tube methods, however with the differential feed process if the tube is comprised entirely of the material to be applied, then a fibre to a required thickness would result from the drawing process.

Another example of thin layer application with strength benefit possibilities is the use of synthetic silica sleeve material. This is relatively much more expensive than the natural fused quartz typically used for fabricating optical fibre rod preforms but it has been shown to yield very high strength fibres. It is considered that this is probably due to the synthetic silica having superior homogeneity and freedom from bubbles and inclusions. Surface defects are responsible for low strain fibre failures and therefore the benefits of synthetic silica would be most noticeable in the outer region of the fibre. Whereas conventional rod-in-tube techniques enable a synthetic silica sleeve tube to be used in conjunction with a rod preform fabricated from a natural fused quartz tube, thus offering some cost saving over an all-synthetic silica construction, the differential feed process offers a method for economically fabricating fibre with a high strength synthetic silica jacket, since it permits the thickness of the jacket to be controlled to the minimum required to obtain sufficient strength benefit.

Figure 3:
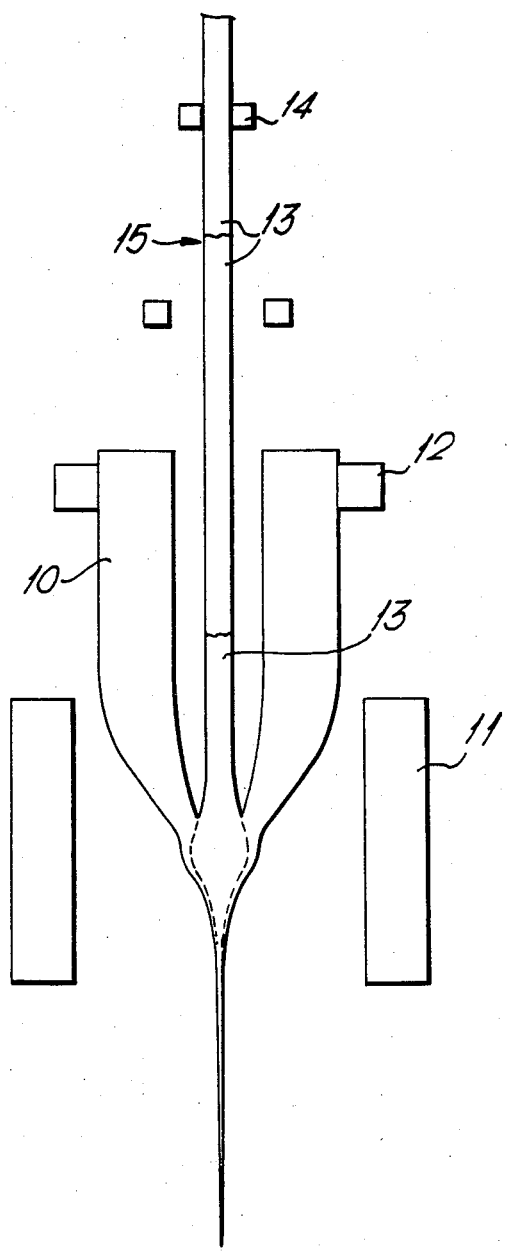
FIG. 3 illustrates a method of achieving "continuous" drawing of optical fibre.

The differential feed rod-in-tube technique also facilitates the production of very long fibre lengths, as will now be described with reference to FIG. 3 in which a sleeve tube billet 10 is advanced into a furnace 11 at a first speed by means of a sleeve advance mechanism 12 whereas a rod preform 13 is advanced into the furnace within the sleeve by an advance mechanism 14 indicated as a "hand-over-hand" mechanism, although it may be comprised otherwise. The mechanisms 12 and 14 are inter-related in order to permit similar pivotal movement of the rod 13 with respect to top and centre of the tube 10 to that mentioned above. In the technique illustrated in FIG. 3, however, a number of rod preforms 13 are consecutively fed into the top end of a tube which is initially much more massive than required to obtain the required geometry for a single rod preform. This consecutive feed technique enables a single very long length of fibre to be drawn from an assembly with a continuous, non-contacted, and therefore guaranteed clean, outer surface. The resultant fibre will have uniform diameter and strength characteristics even in areas corresponding to joints in the inner rod preform. The inner rod preforms may be fusion spliced (as at 15) prior to introduction into the bore of the sleeve tube, this either being done continuously, in line with the draw, or as a batch to make a very long unit preform prior to the start of the draw. Alternatively, the rod preforms may be introduced unjointed into the top of the sleeve, the pressure required to sustain the correct feed rate being maintained on that part of the preform entering the hot zone by transfer of pressure through the sections above. The end faces are so prepared that adjacent ends coalesce as they soften in the hot zone. Coaxial alignment of ends may be controlled by, for example, maintaining a close fit between sleeve bore and rod preform O/D.

Thus the differential feed rod-in-tube technique permits "continuous" production of fibre, the ultimate unit length being limited only by the mass of the sleeve billet, which can be considerable. For example, a 1000 mm×20 mm bore ×40 mm O/D sleeve would weigh 10 kg and yield 370 km of fibre at 125 µm, in addition to the contribution of mass made by the preforms themselves. At current preform diameters and preform to sleeve material mass ratios such an assembly would give 660 km of fibre from the above sleeve and 21.5 meters of rod preform. Whilst the junctions between the drawn down rod sections might result in adverse properties of the fibre thereat, the technique is still advantageous since these junction areas can be cut out, resulting in usable lengths of fibre greater than the usable length produced from a rod-in-tube unit employing a single rod preform, where there are losses in fibre yield, primarily at the start of a draw, caused by process parameters such as fibre diameter and coating conditions being non-optional.

We claim:

1. In a rod-in-tube method of manufacturing an optical fibre including the steps of positioning a glass rod preform within a glass sleeve tube which is disposed with its longitudinal axis vertical; feeding the glass rod preform and the glass sleeve tube into a heating zone of a furnace in which the glass sleeve tube collapses onto the outer surface of the glass rod preform to form a single glass element; and drawing the single glass element down whereby to provide optical fibre with a core formed from the glass rod preform and cladding on the core formed from the glass sleeve tube; the improvement comprising the additioning step of mounting the glass rod preform, during the said positioning step, within the glass sleeve tube in such a manner that the glass rod preform pivots freely about a point at the top and in the center of the glass sleeve tube; and the additional step of feeding the glass rod preform and the glass sleeve tube into the heating zone at the different rates, the glass rod preform feed rate being greater than the glass sleeve tube feed rate whereby to achieve a drawn-on profile which is bulged out and convex below the point where the glass sleeve collapses onto the glass rod preform whereby to achieve forces tending to cause self-centering of the glass rod preform in the glass sleeve tube when the glass sleeve tube collapses onto the glass rod preform, said self-centering being permitted to occur by virtue of said pivotal mounting of the glass rod preform within the glass sleeve tube.

2. A method as claimed in claim 1 including the step of in-line monitoring the core to outside diameter ration of fibre drawn from the single glass element, and controlling the relative feed rates of the glass rod preform and the glass sleeve tube in response thereto whereby to obtain drawn fibre with a predetermined core to outside diameter ratio.

3. A method as claimed in claim 2, whereby the initial mass of the glass sleeve tube relative to that of the glass rod preform is greater than that required for coating the glass rod preform to a required thickness, and including the step of consecutively feeding glass and preform elements into the top of the glass sleeve tube.

4. A method as claimed in claim 3, wherein the consecutive glass rod preform elements are fusion spliced.

5. A method as claimed in claim 1, wherein the glass rod preform is constituted by a glass portion manufactured to provide the core material of the fibre together with a core-cladding structure disposed on said glass portion.

6. A method as claimed in claim 5, wherein the glass sleeve tube is comprised by a material such as to improve the properties of the optical fibre whereby the fibre is automatically coated with said material during drawing of the fibre.

7. A method as claimed in claim 6, wherein said material comprises titanium doped silica.

* * * * *